(12) United States Patent
Yamamoto et al.

(10) Patent No.: US 7,371,477 B2
(45) Date of Patent: May 13, 2008

(54) EXHAUST GAS PROCESSING DEVICE FOR FUEL CELL

(75) Inventors: Akio Yamamoto, Saitama (JP);
Kazunori Fukuma, Saitama (JP);
Takatsugu Koyama, Saitama (JP);
Hideo Numata, Saitama (JP);
Masahiro Matsutani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 645 days.

(21) Appl. No.: 10/678,820

(22) Filed: Oct. 3, 2003

(65) Prior Publication Data
US 2004/0072052 A1 Apr. 15, 2004

(30) Foreign Application Priority Data
Oct. 3, 2002 (JP) ............................. 2002-291003

(51) Int. Cl.
*H01M 8/04* (2006.01)
*H01M 8/06* (2006.01)

(52) U.S. Cl. .............................. 429/17; 429/19; 429/22

(58) Field of Classification Search ..................... None
See application file for complete search history.

(56) References Cited

U.S. PATENT DOCUMENTS 4,853,045 A * 8/1989 Rozendaal ................. 148/103

| | | | |
|---|---|---|---|
| 6,426,158 B1 * | 7/2002 | Pratt et al. ..................... 429/13 |
| 6,916,563 B2 * | 7/2005 | Yamamoto et al. ........... 429/17 |
| 2003/0087138 A1 * | 5/2003 | Margiott et al. .............. 429/17 |
| 2003/0194590 A1 * | 10/2003 | Cargnelli et al. ............. 429/26 |
| 2004/0013919 A1 * | 1/2004 | Ueda et al. .................... 429/22 |

FOREIGN PATENT DOCUMENTS

| JP | 03-010077 | * | 1/1991 |
| JP | 06-275300 | | 9/1994 |
| JP | 11-185781 | | 7/1999 |
| JP | 2000-357530 | * | 12/2000 |
| JP | 2001-313055 | | 11/2001 |
| JP | 2002-289237 | | 10/2002 |

* cited by examiner

*Primary Examiner*—Jonathan Crepeau
(74) *Attorney, Agent, or Firm*—Lahive & Cockfield, LLP; Anthony A. Laurentano, Esq.

(57) ABSTRACT

Hydrogen gas supplied to and then purged from a fuel cell is temporarily retained in a reservoir provided in an exhaust fuel diluter, and diluted before release into atmosphere. Cathode exhaust gas discharged from a cathode of the fuel cell is mixed to dilute the hydrogen gas, and air continues to be supplied to the cathode of the fuel cell for a specific period of time even after generation of electric power in the fuel cell is stopped, so that the hydrogen gas retained in the reservoir is continuously diluted with the cathode exhaust gas and released. Air for ventilation of the fuel cell may be used instead or in addition, to dilute and release the hydrogen gas retained in the reservoir after the generation of electric power in the fuel cell is stopped.

9 Claims, 8 Drawing Sheets

EXHAUST GAS PROCESSING DEVICE FOR FUEL CELL

BACKGROUND OF THE INVENTION

This invention relates to an exhaust gas processing device for a fuel cell used as a power source of an electric vehicle.

A fuel cell system is provided as a power source in an electric vehicle (hereinafter referred to simply as "vehicle"), and in cases, for example, where pure hydrogen (hereinafter referred to simply as "hydrogen") is used for fuelling the fuel cell system, a hydrogen supply ductwork for the fuel cell system includes a recirculation system which is connected to an anode vent of a fuel cell stack and adapted to recirculate anode exhaust gas in order to improve utilization efficiency of hydrogen and thus to enhance fuel economy of the electric vehicle (e.g., see Japanese Laid-Open Patent Application, Publication No. 6-275300).

To circulate (and recirculate) hydrogen, a variety of devices are available, which include: a blower that produces a current of hydrogen, an ejector that produces a suction pressure to withdraw hydrogen, a vacuum pump, and the like. In the recirculation system, as recirculation continues for a long time, the concentration of impurities, such as nitrogen, in hydrogen would increase in most instances, which would cause the efficiency of electric power generation to decrease. The anode exhaust gas which contains impurities but still has a high concentration of hydrogen should not be released as it stands.

Accordingly, the fuel cell system is provided with a diluter in which the anode exhaust gas containing unreacted hydrogen is diluted so as to have a lower concentration of hydrogen before it is discharged to the outside of the fuel cell system. Moisture or water discharged together with hydrogen from the fuel cells could build up in pipes of the recirculation system connected to the anode vent of the fuel cell stack, and would disadvantageously impede the normal flow of hydrogen in the pipes of the recirculation system. Such moisture or water may also be discharged via the diluter to the outside of the fuel cell system.

Thus, the unreacted hydrogen is purged from the anode of the fuel cell stack and diluted with exhaust gas in the diluter, though such arrangement is not disclosed in the aforementioned reference.

Accordingly, the fuel cell system is adapted to force the hydrogen containing impurities such as nitrogen to be purged and discharged together with the moisture or water to the outside at frequent times, e.g., when the vehicle stops to wait at traffic lights. However, when a starter switch is turned off to stop a motor of the vehicle, the generation of electric power in the fuel cell stack stops entirely, and thus the flow of the cathode exhaust gas (cathode off gas as exhaust air) stops at the same time. Therefore, hydrogen that has not been discharged remains in the diluter. The hydrogen remaining in the diluter, if left untreated, diffuses spontaneously, and would disadvantageously flow back to the fuel cell stack and pipes.

The present invention has been made to address the above-described disadvantages. Therefore, it is an exemplary general object of the present invention to provide a device that can reduce a concentration of hydrogen remaining in the diluter and discharge the same to the outside, even after the generation of electric power in the fuel cell stops.

SUMMARY OF THE INVENTION

According to one exemplified aspect of the present invention, an exhaust gas processing device for a fuel cell, in which the fuel cell is supplied with air and hydrogen gas to generate electric power, includes a reservoir that retains the hydrogen gas purged from the fuel cell, and the hydrogen gas retained in the reservoir is diluted and released into atmosphere even after generation of electric power in the fuel cell is stopped.

In the above exhaust gas processing device for a fuel cell, several preferable constructions may be adopted in order to dilute and release the hydrogen gas in the reservoir after generation of electric power in the fuel cell is stopped. For example, the hydrogen gas retained in the reservoir may be mixed and diluted with cathode exhaust gas discharged from a cathode of the fuel cell before the hydrogen gas is released into the atmosphere. In this construction, air continues to be supplied to the cathode of the fuel cell so that the hydrogen gas retained in the reservoir is released together with the cathode exhaust gas, after the generation of electric power in the fuel cell is stopped. Moreover, the air preferably continues to be supplied to the cathode of the fuel cell for a specific period of time after the generation of electric power in the fuel cell is stopped, and the specific period of time expires when a predetermined period of time elapses and/or when a concentration of hydrogen in the reservoir decreases to a predetermined value or smaller.

The above construction is adapted to continuously supply air to the cathode of the fuel cell even after the generation of electric power in the fuel cell is stopped, and thus allows hydrogen retained in the reservoir to be gradually diluted and released into the atmosphere.

Another exemplary construction applicable to the above exhaust gas processing device may further include a hydrogen relief valve that is connected to the reservoir, and the hydrogen relief valve is opened when the generation of electric power in the fuel cell is stopped, and air for ventilation of the fuel cell is supplied to a passage connected to the hydrogen relief valve. Moreover, the air for ventilation of the fuel cell preferably continues to be supplied to the ventilation passage for a specific period of time after the generation of electric power in the fuel cell is stopped, and the specific period of time expires when a predetermined period of time elapses and/or when a concentration of hydrogen in the reservoir decreases to a predetermined value or smaller.

The above construction is adapted to open the hydrogen relief valve when the generation of electric power in the fuel cell is stopped, and to continuously supply the air for ventilation to the passage connected to the hydrogen relief valve even after the generation of electric power in the fuel cell is stopped; thus hydrogen retained in the reservoir is gradually diluted and released into the atmosphere.

The above construction may further include a hydrogen sensor provided downstream of the ventilation passage, to detect a breakdown of the hydrogen relief valve during the generation of electric power in the fuel cell. With the hydrogen sensor provided downstream of the ventilation passage, hydrogen which leaks into the ventilation passage can be detected even if the hydrogen relief valve is opened as a result of a breakdown thereof. Therefore, the breakdown of the hydrogen relief valve can be found without fail.

It is understood that the above-described two exemplary constructions may be adopted in combination, so that the hydrogen retained in the reservoir is gradually diluted and released into the atmosphere.

According to another exemplary aspect of the present invention, an exhaust gas processing device for a fuel cell, in which the fuel cell is supplied with air and hydrogen gas to generate electric power and the hydrogen gas discharged from an anode of the fuel cell is recirculated in a hydrogen recirculation piping system, includes: a reservoir in which hydrogen gas purged from the hydrogen recirculation piping system is retained; a cathode exhaust gas pipe that is connected to a cathode of the fuel cell and provided with holes through which the hydrogen gas retained in the reservoir is sucked in so that the hydrogen gas is diluted with cathode exhaust gas and released into atmosphere; and a blower that supplies air to the cathode of the fuel cell and forces the air discharged from the cathode of the fuel cell to flow through the cathode exhaust gas pipe. In this arrangement, the hydrogen gas retained in the reservoir is diluted and released into the atmosphere even after generation of electric power in the fuel cell is stopped.

After the generation of electric power in the fuel cell is stopped, the hydrogen gas retained in the reservoir may be diluted and released by allowing the blower to continue to supply air to the cathode of the fuel cell. According to this construction, the hydrogen gas retained in the reservoir can be diluted and released into the atmosphere even after the generation of electric power in the fuel cell is stopped. Instead, the exhaust gas processing device may further include: a hydrogen relief valve that is connected to the reservoir; and a ventilator that supplies air for ventilation of the fuel cell, so that when the generation of electric power in the fuel cell is stopped, the hydrogen relief valve is opened and the ventilator supplies air for ventilation of the fuel cell and forces the air for ventilation of the fuel cell to flow through a passage connected to the hydrogen relief valve. According to this construction, the hydrogen gas retained in the reservoir can be diluted and released into the atmosphere after the generation of electric power in the fuel cell is stopped. It is also to be understood that these two exemplary constructions may be adopted in combination. The blower and/or ventilator may continue to supply air for a specific period of time after the generation of electric power in the fuel cell is stopped. The specific period of time may be configured to expire when a predetermined period of time elapses and/or when a concentration of hydrogen in the reservoir decreases to a predetermined value or smaller.

The above construction may further include a hydrogen sensor provided downstream of the ventilation passage, to detect a breakdown of the hydrogen relief valve during the generation of electric power in the fuel cell. With the hydrogen sensor provided downstream of the ventilation passage, hydrogen which leaks into the ventilation passage can be detected even if the hydrogen relief valve is opened as a result of a breakdown thereof. Therefore, the breakdown of the hydrogen relief valve can be found without fail.

The concentration of hydrogen in the reservoir may be detected by a hydrogen sensor provided in the reservoir.

Other objects and further features of the present invention will become readily apparent from the following description of preferred embodiments with reference to accompanying drawings.

DETAILED DESCRIPTION OF THE PREFERRED EMBODIMENTS

A description will be given hereafter of exemplary embodiments of an exhaust gas processing device according to the present invention with reference to the drawings.

Figure 1:
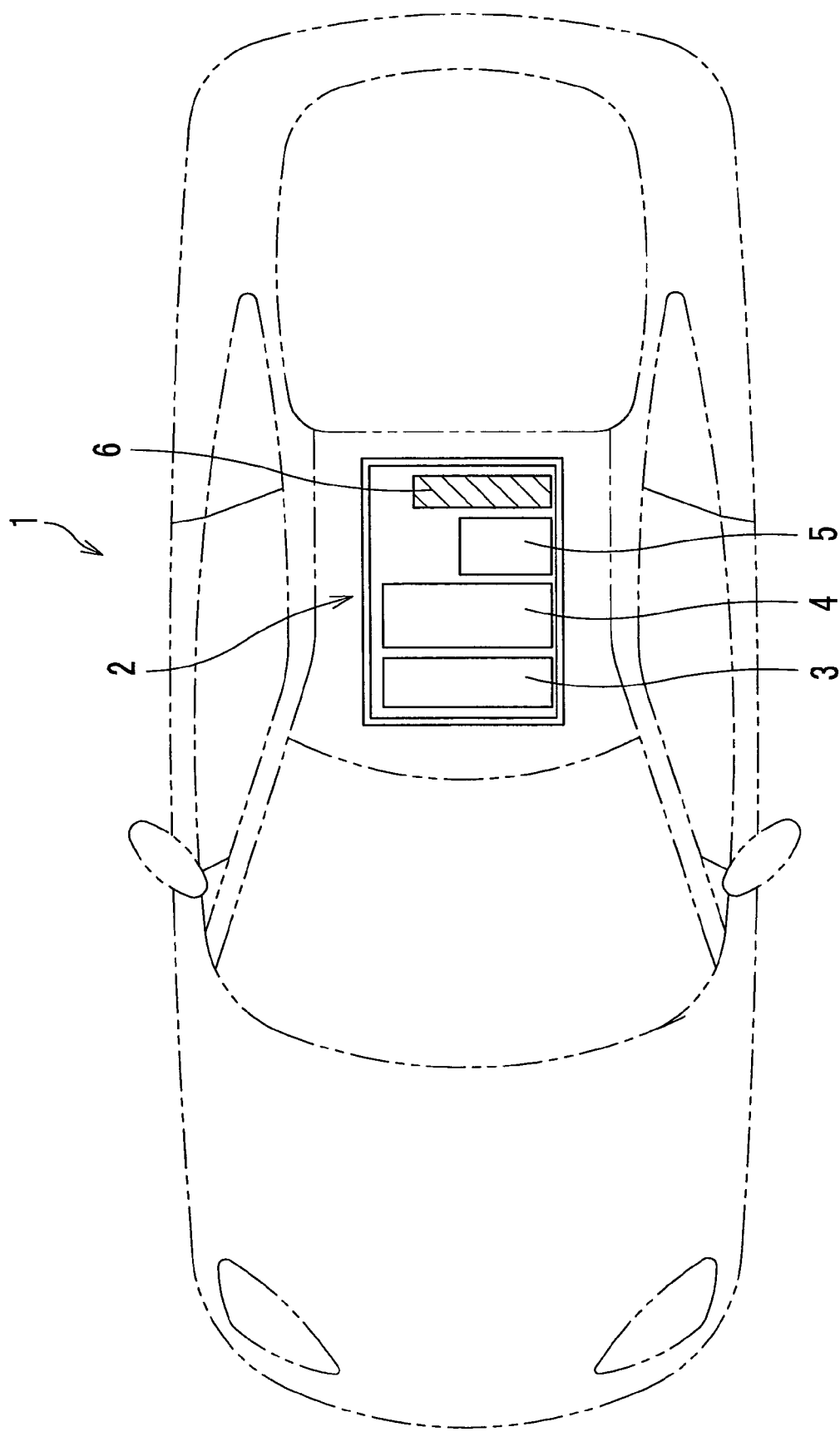
FIG. 1 shows a layout of a fuel cell system box as installed in a fuel-cell electric vehicle, in which an exhaust gas processing device for a fuel cell according to the present invention is provided.

Referring to FIG. 1, a fuel cell system box 2 is installed in a fuel cell electric vehicle 1, particularly, nearly in a midsection as viewed from the top of the vehicle 1 and under the floor of the passenger's compartment. Within the fuel cell system box 2 is provided a fuel cell system, which includes a thermoregulator 3, a fuel cell stack 4, a humidifier 5, and an exhaust fuel dilutor 6, arranged in this sequence from the front to the rear of the vehicle 1. It is understood, though not illustrated in FIG. 1, that the fuel cell system further includes a radiator for cooling the fuel cell stack 4, a high-pressure hydrogen reservoir, and other components.

The fuel cell stack 4 receives hydrogen fuel stored in the high-pressure hydrogen reservoir and air taken in from outside of the vehicle 1, and generates electric power. Thus-generated electric power is supplied to the vehicle 1 and used to drive the vehicle 1. In order to make the fuel cell stack 4 operate adequately, the thermoregulator 3 serves to regulate temperature of hydrogen and air supplied to the fuel cell stack 4, and the humidifier 5 serves to humidify the hydrogen and air supplied to the fuel cell stack 4. The exhaust fuel diluter 6 is used to temporarily hold hydrogen purged from pipes connected to an anode vent of the fuel cell stack 4, and to make the hydrogen thinner by admixture with exhaust air and then discharge the same to the outside.

Figure 2:
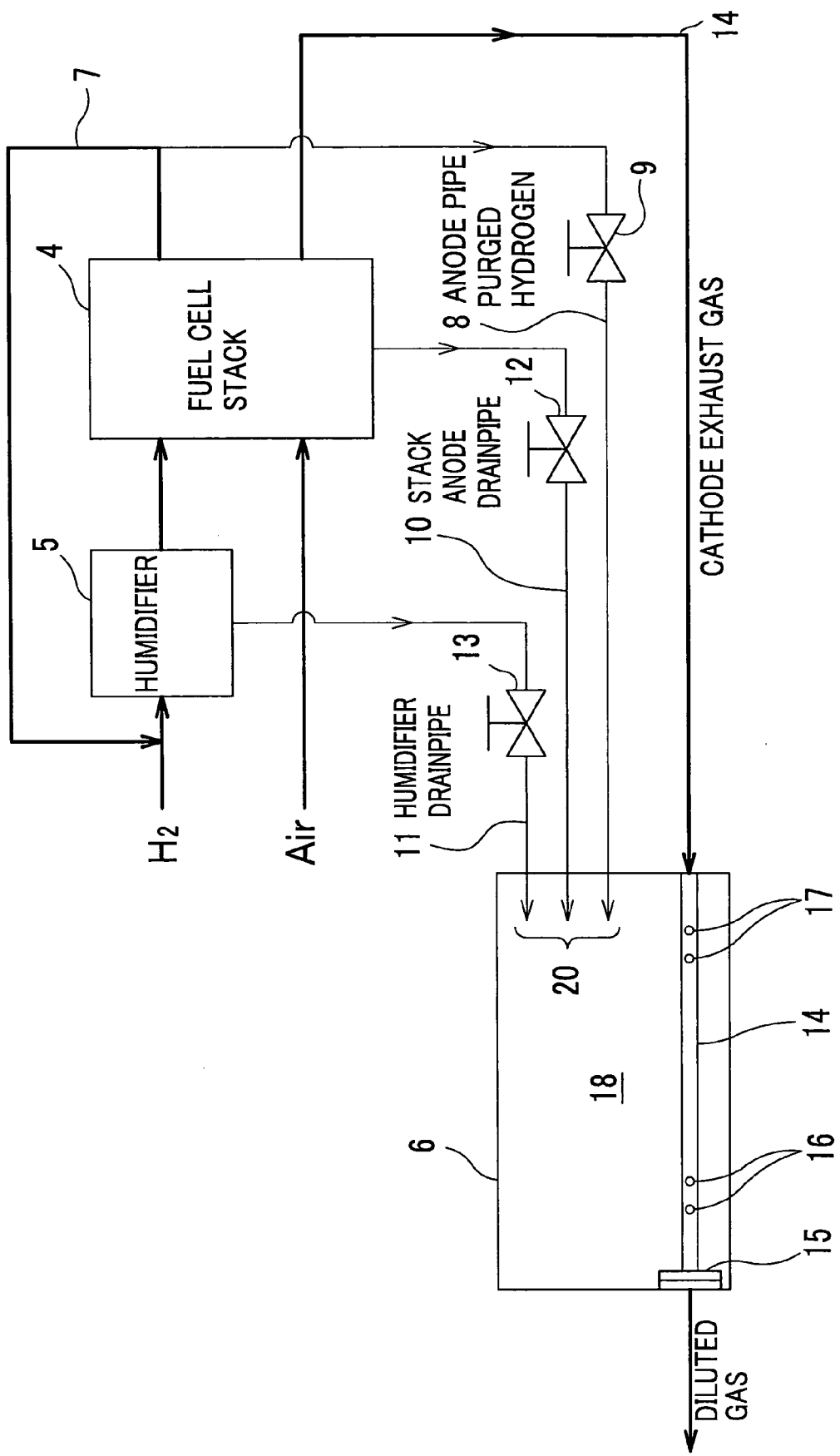
FIG. 2 is a system chart of an exhaust fuel diluter according to one exemplary embodiment of the present invention.

Turning to FIG. 2, hydrogen that has been supplied to but not reacted in the fuel cell stack 4 is flowed back to the upstream of the humidifier 5 through a pipe 7, which constitutes a recirculation system (hydrogen recirculation piping system), in order to improve utilization efficiency of the hydrogen and thus to enhance fuel economy of the vehicle 1. In order to purge hydrogen that has an increased concentration of impurities mixed therein as a result of repeatedly performed recirculation, as well as water that has built up in the pipe 7 during the recirculation, the pipe 7 of the recirculation system is adapted to branch off into a purged hydrogen pipe 8, which is connected to the exhaust fuel diluter 6. The purged hydrogen pipe 8 is provided with a shutoff valve 9 that operates automatically or is manually operated. The shutoff valve 9 is closed in normal operation times and opened when the hydrogen and water are purged.

In order to draw drainage off from the anode of the fuel cell stack 4 and from the humidifier 5, an anode drainpipe 10 and a humidifier drainpipe 11 are connected to the exhaust fuel diluter 6. The anode drainpipe 10 and the humidifier drainpipe 11 are provided with shutoff valves 12, 13, respectively, which each operate automatically or are manually operated.

A cathode exhaust gas pipe 14 for discharging cathode exhaust gas derived from the fuel cell stack 4 to the outside is connected to (partially incorporated in) the exhaust fuel diluter 6. A cathode exhaust gas pipe 14 (particularly, a portion incorporated in the exhaust fuel diluter 6) is provided with suction holes 17 through which hydrogen retained in the exhaust fuel diluter 6 (reservoir 18) is sucked in.

At an upper portion of the exhaust fuel diluter 6 are provided inlet ports 20 through which purged hydrogen discharged from the purged hydrogen pipe 8 of the recirculation system, and drainage drawn off from the anode drainpipe 10 and the humidifier drainpipe 11 are flowed in. The inside of the exhaust fuel diluter 6 serves as the reservoir 18 for hydrogen flowed therein through the inlet ports 20.

In the fuel cell system box 2 as thus constructed, purged hydrogen discharged into the reservoir 18 inside the exhaust fuel diluter 6 diffuses and expands in volume, thus being retained therein for some period of time. Thereafter, the purged hydrogen is sucked through the suction holes 17 into the cathode exhaust gas pipe 14 arranged in the exhaust fuel diluter 6 by the action of exhaust air flowing in the cathode exhaust gas pipe 14. The purged hydrogen is diluted with the exhaust air in the cathode exhaust gas pipe 14, and the exhaust gas containing a low concentration of hydrogen is discharged to the outside. Condensed water contents in the exhaust air discharged from the humidifier 5 and the fuel cell stack 4 are also discharged together with the exhaust air. In FIG. 2, denoted by 15 is a backfire-trapping filter, and denoted by 16 are drain holes.

Hydrogen containing impurities in the fuel cell stack 4 is purged and carried to the exhaust fuel diluter 6 at frequent times, e.g., when the vehicle stops to wait at traffic lights. However, when a starter switch is turned off to entirely stop the generation of electric power in the fuel cell stack 4, the flow of the exhaust air stops at the same time; therefore, hydrogen that has not been discharged remains in the exhaust fuel diluter 6. Further, hydrogen remains in the fuel cell stack 4, as well.

In the preferred embodiments of the present invention, a scavenging system is provided in which hydrogen remaining in the exhaust fuel diluter 6 is scavenged after generation of electricity in the fuel cell stack 4 stops. The scavenging system includes a blower that forces air from a cathode in the fuel cell stack 4 to the exhaust fuel diluter 6 even after generation of electricity stops, and/or a ventilator that forces gas remaining in the fuel cell stack 4 out after generation of electricity stops.

Figure 3:
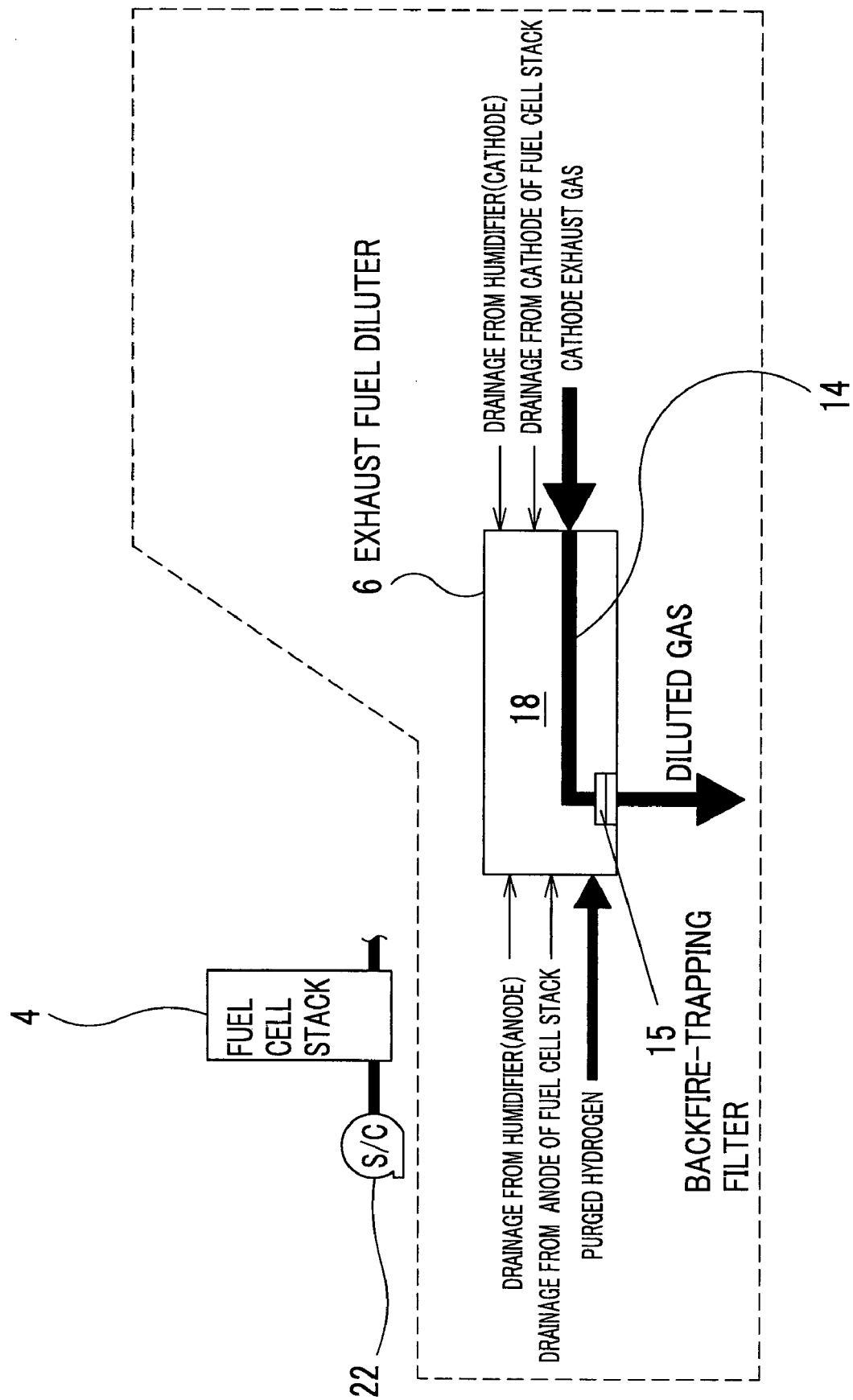
FIG. 3 is a system chart of a principal portion of an exhaust gas processing device for a fuel cell according to a first embodiment of the present invention.
Figure 4:
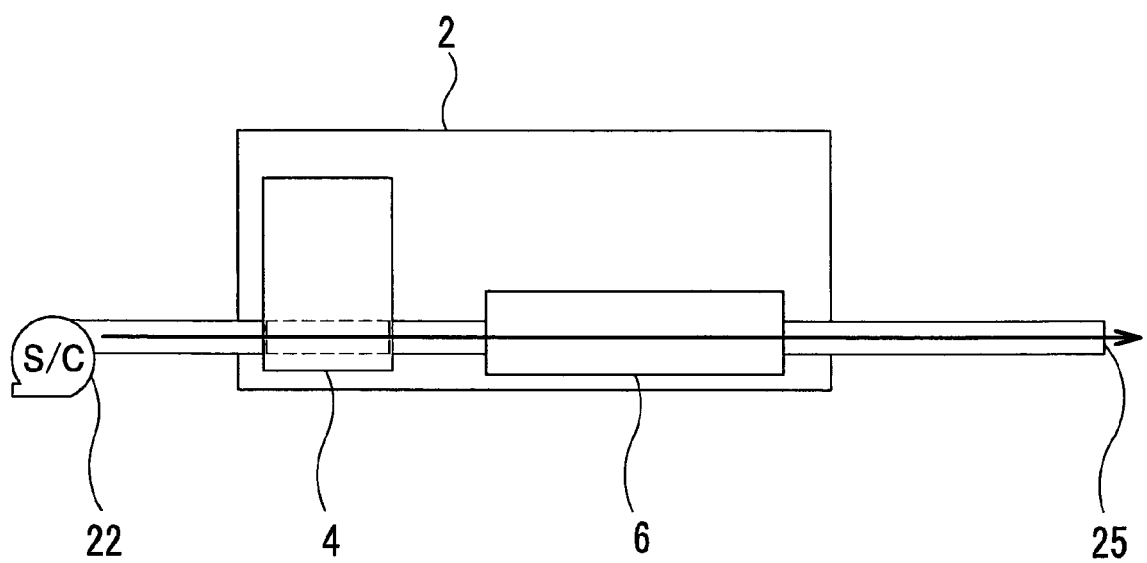
FIG. 4 is a schematic diagram of the first embodiment of the exhaust gas processing device for a fuel cell according to the present invention for explaining operation of a supercharger for a specific period of time.
Figure 5:
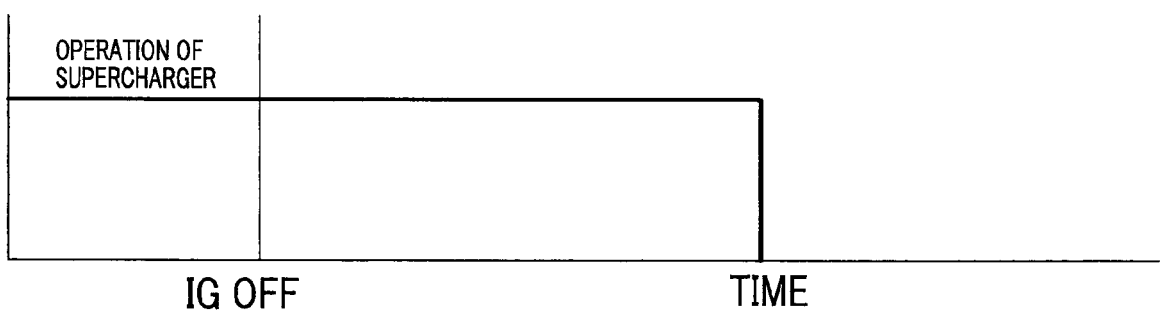
FIG. 5 is a time chart of the operation of the supercharger for the specific period of time as shown in FIG. 4.

Referring next to FIGS. 3 through 5, a description will be given of a first embodiment of the exhaust gas processing device for a fuel cell according to the present invention.

In the first embodiment, the scavenging system for the exhaust gas processing device includes, as shown in FIGS. 3 and 4, a supercharger 22 as a blower that forces air from a cathode in the fuel cell stack 4 to the exhaust fuel diluter 6 even after generation of electricity stops. Hereupon, denoted by 25 is a cathode exhaust port.

According to the first embodiment, the supercharger 22 is operated not only during a period of time when the anode and pipes of the recirculation system connected to the anode vent of the fuel cell stack 4 are being purged, but also for a specific period of time after the starter switch is turned off (IG OFF) to stop generation of electricity in the fuel cell stack 4, as shown in the time chart of FIG. 5. The supercharger 22 is operated continuously for a specific period of time (until a predetermined period of time elapses or until a concentration of hydrogen in the exhaust fuel diluter 6 decreases to a predetermined value or smaller), and forces cathode exhaust gas to flow from the fuel cell stack 4 through the cathode exhaust gas pipe 14 that lies through the exhaust fuel diluter 6 (by supplying air to the cathode of the fuel cell stack 4) as shown in FIG. 4. The predetermined period of time of operation of the supercharger 22 is calculated from the capacity of the exhaust fuel diluter 6 and the amount of purged hydrogen discharged per unit time. In order to detect the lapse of the specific period of time using the value of concentration of hydrogen in the exhaust fuel diluter 6, a hydrogen sensor is provided in the exhaust fuel diluter 6 to monitor the change of the concentration of hydrogen therein. Provision of the hydrogen sensor in the exhaust fuel diluter 6 will be described later in details as a fifth embodiment of the present invention.

As shown in FIG. 3, air blown by the supercharger 22 enters the fuel cell stack 4, and serves to discharge cathode exhaust gas. The cathode exhaust gas forced out of the fuel cell stack 4 by the supercharger 22 passes through the cathode exhaust gas pipe 14 that lies through the exhaust fuel diluter 6. During that time, hydrogen in the reservoir 18 is sucked and diluted with the cathode exhaust gas. The air blown by the supercharger 22 also forces drainage from the humidifier 5 (see FIG. 2) and drainage from the cathode of the fuel cell stack 4 (humidifier cathode drainage and stack cathode drainage in FIG. 3) to flow into the exhaust fuel diluter 6. In FIG. 3, the flows of exhaust gas and drainage from the cathode of the fuel cell stack 4 (and the humidifier 5) are indicated by three arrows at the right side of the exhaust fuel diluter 6. On the other hand, indicated by three arrows at the left side of the exhaust fuel diluter 6 are the flows of exhaust gas and drainage from the anode of the fuel cell stack 4 (and the humidifier 5) as described above with reference to FIG. 2.

Hydrogen and drainage (water) are sucked into the cathode exhaust gas pipe 14 through the suction holes 17 and the drain holes 16 (see FIG. 2) provided in the cathode exhaust gas pipe 14 through which exhaust air having a high flow rate and low pressure (by Bernoulli law) is passing. The hydrogen mixed and diluted with the exhaust air flowing at high speed through the cathode exhaust gas pipe 14, and drawn out by the flow of the exhaust air from the cathode exhaust port 25 (see FIG. 4) to the outside with the concentration of hydrogen lowered to an adequate level. The drain (water) is drawn off to the outside in a like manner.

Thus, even after the starter switch is turned off, the supercharger 22 continues to be operated to perform the dilution and discharge of hydrogen in the reservoir 18; therefore, the spontaneous diffusion and backflow of the hydrogen can be prevented.

Figure 6:
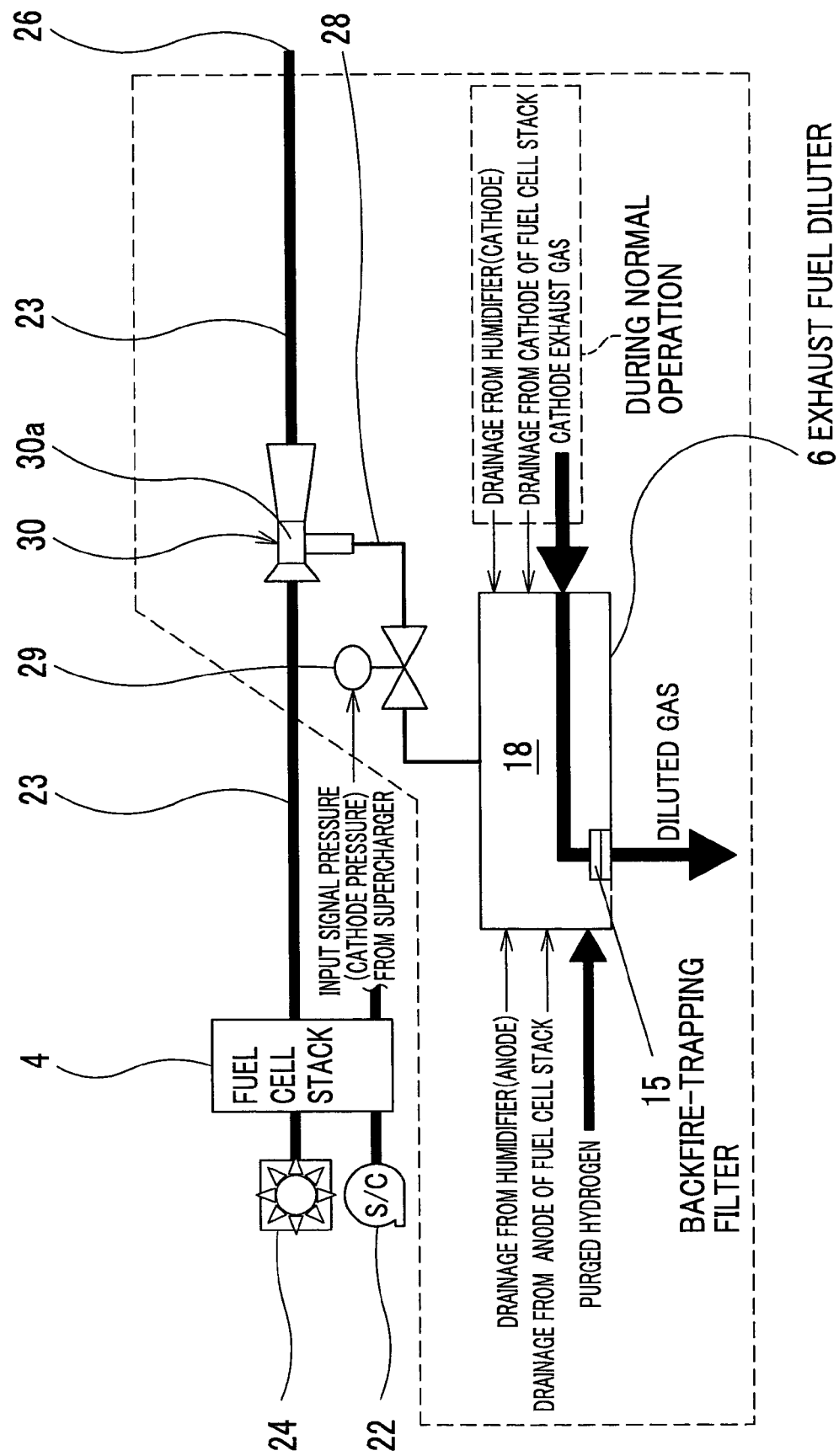
FIG. 6 is a system chart of a principal portion of an exhaust gas processing device for a fuel cell according to a second embodiment of the present invention.
Figure 7:
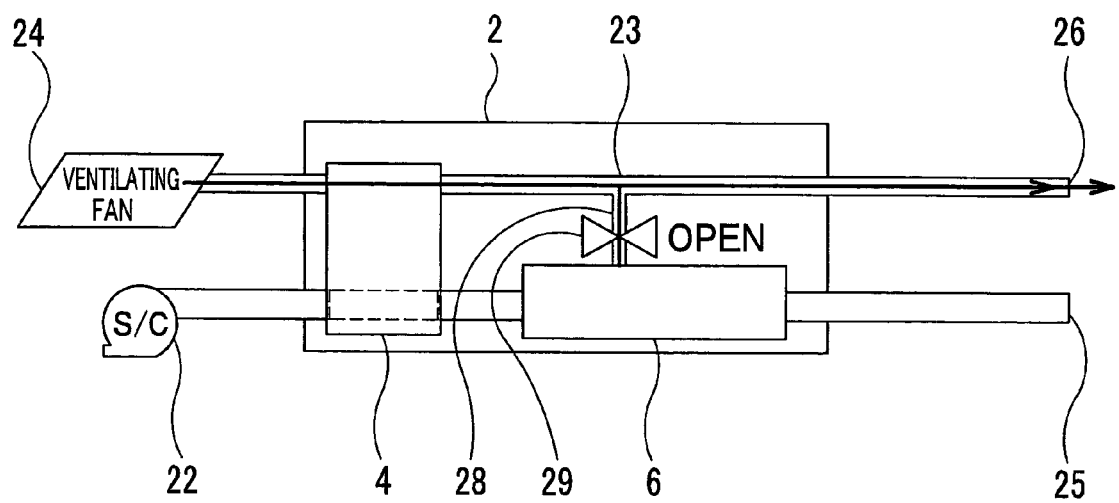
FIG. 7 is a schematic diagram of the second embodiment of the exhaust gas processing device for a fuel cell according to the present invention for explaining continuous operation of a fan.
Figure 8:
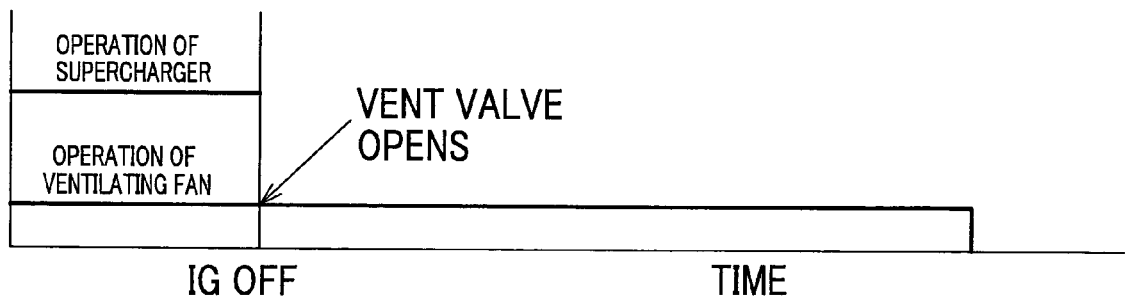
FIG. 8 is a time chart of the continuous operation of the fan as shown in FIG. 7.

Referring to FIGS. 6 through 8, a description will be given of a second embodiment of the exhaust gas processing device for a fuel cell according to the present invention. Those components to be deemed identical with those of the first embodiment are designated by the same reference numerals as used in the description of the first embodiment, and a detailed description thereof will be omitted below.

In the second embodiment, as shown in FIGS. 6 and 7, a supercharger 22 as a blower that forces air from a cathode in the fuel cell stack 4 to the exhaust fuel diluter 6 during normal operation, and a fan 24 as a ventilator that forces gas remaining in the fuel cell stack 4 out through a ventilation pipe 23 after generation of electric power stops are used as a scavenging system for the exhaust gas processing device. The ventilation pipe 23 is connected with the exhaust fuel diluter 6 via a pipe 28, and at a point in the pipe 28 is provided a relief valve 29 as a pressure-adjustable vent valve that opens and closes according to change in pressure of the cathode exhaust gas supplied by the supercharger 22. At a joint spot on the ventilation pipe 23 where the pipe 28 is joined is provided an injector 30 having a throat 30a of which an inside diameter is smaller than that of the ventilation pipe 23. The relief valve 29 is configured, for example, to close when an input signal pressure (cathode pressure) from the supercharger 22 is equal to or higher than 15 kPa, and to open when the input signal pressure is equal to or lower than 5 kPa. The fan 24 used herein is a ventilator that is usually provided for ventilating an outside of the fuel cell stack 4.

According to the second embodiment, as shown in FIG. 8, when the starter switch is turned off (IG OFF) to stop generation of electric power in the fuel cell stack 4, the operation of the supercharger 22 is stopped, but the fan 24 (ventilating fan) continues to be operated. When the operation of the supercharger 22 is stopped, the input signal pressure (cathode pressure) from the supercharger 22 becomes 5 kPa or lower, and the relief valve 29 (vent valve) shown in FIG. 7 opens. At this stage, the pressure in the throat 30a of the ejector 30 (see FIG. 6) becomes lower than that in the exhaust fuel diluter 6 because air blown by the fan 24 flows at an increased speed through the throat 30a of the ejector 30 which is narrower than the ventilation pipe 23. Consequently, suction is created in the throat 30a such that the purged hydrogen retained in the reservoir 18 of the exhaust fuel diluter 6 is sucked, and then mixed and diluted with air passing through the ventilation pipe 23. The hydrogen whose concentration thus becomes lower to an adequate level is discharged through a stack ventilating port 26 to the outside.

The fan 24 eventually stops after a lapse of a specific period of time, and as in the first embodiment, the specific period of time may be predetermined as a fixed value which has been calculated beforehand, or determined based upon a changing concentration of hydrogen in the reservoir 1, the change of which is monitored by a hydrogen sensor that will be described later.

According to the second embodiment, hydrogen remaining in the reservoir 18 after generation of electric power in the fuel cell stack 4 can be diluted before it is discharged to the outside, by making use of the fan 24 which the most fuel cell system 2 is equipped with as standard equipment.

Figure 9:
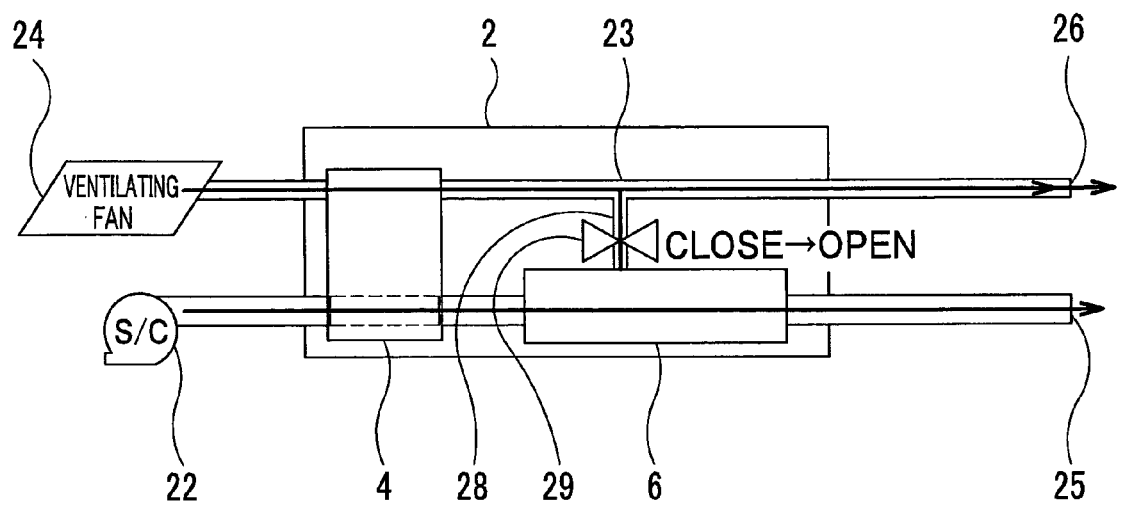
FIG. 9 is a system chart of a principal portion of an exhaust gas processing device for a fuel cell according to a third embodiment of the present invention.
Figure 10:
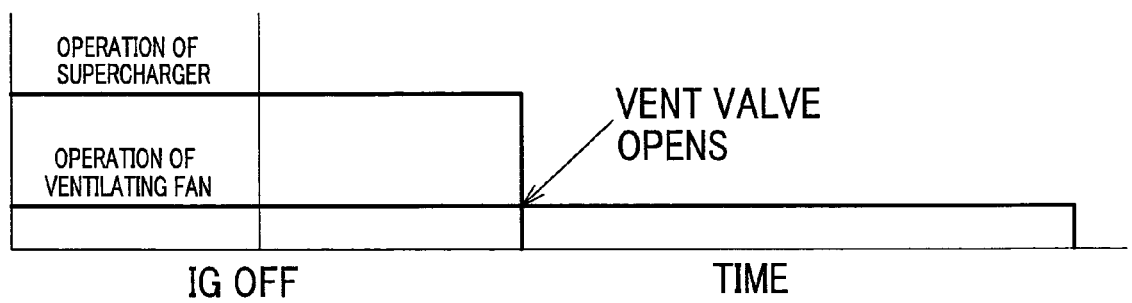
FIG. 10 is a time chart showing operation of a supercharger for a specific period of time and continuous operation of a fan.

Referring to FIGS. 9 and 10, a description will be given of a third embodiment of the exhaust gas processing device for a fuel cell according to the present invention. Those components to be deemed identical with those of the first and second embodiments are designated by the same reference numerals as used in the description of the embodiments, and a detailed description thereof will be omitted below.

It is understood that the third embodiment combines the constructions and features of the first and second embodiments.

According to the third embodiment, as shown in FIG. 10, even when the starter switch is turned off (IG OFF) to stop generation of electric power in the fuel cell stack 4, the supercharger 22 continues to be operated for a specific period of time, and the fan 24 (ventilating fan) also continues to be operated. As the operation of the supercharger 24 continues, the input signal pressure (cathode pressure) from the supercharger 22 is kept within a range of 15 kPa or higher, and thus the relief valve 29 (vent valve) remains closed. As shown in FIG. 9, the supercharger 24 continuously serves to discharge cathode exhaust gas from the fuel cell stack 4 into the exhaust fuel diluter 6, for a specific period of time (until a predetermined period of time elapses or until a concentration of hydrogen in the exhaust fuel diluter 6 decreases to a predetermined value or smaller).

Purged hydrogen and drain forced into the exhaust fuel diluter 6 diffuses and expands in volume, and thus is retained therein for a while. Thereafter, the purged hydrogen and drainage are sucked into the cathode exhaust gas pipe 14, through which exhaust air (cathode exhaust gas) having a high flow rate and low pressure is passing, through the suction holes 17 and the drain holes 16 (see FIG. 2) provided therein. The purged hydrogen is mixed and diluted with the exhaust air flowing at high speed through the cathode exhaust gas pipe 14, and drawn out by the flow of the exhaust air from the cathode exhaust gas port 25 (see FIG. 9) to the outside with the concentration of hydrogen lowered to an adequate level, together with the drain.

When the operation of the supercharger 22 is stopped after the specific period of time elapses, the input signal pressure (cathode pressure) from the supercharger 22 becomes 5 kPa or lower, and the relief valve 29 (vent valve) shown in FIG. 9 opens. As a result, the high concentration of purged hydrogen (retained hydrogen) still remaining in the exhaust fuel diluter 6 is sucked into the throat 30a of the ejector 30 (see FIG. 6), and then mixed and diluted with air passing through the ventilation pipe 23. Thus-adequately lowered concentration of hydrogen is discharged through the stack ventilating port 26 to the outside.

Figure 11:
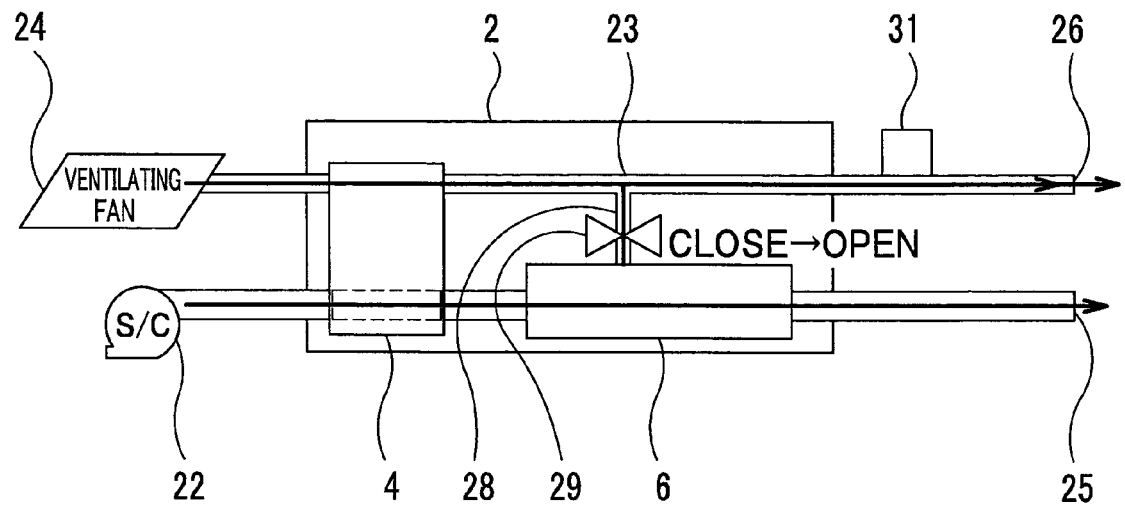
FIG. 11 is a system chart of a principal portion of an exhaust gas processing device for a fuel cell according to a fourth embodiment of the present invention.

Referring now to FIG. 11, a description will be given of a fourth embodiment of the exhaust gas processing device for a fuel cell according to the present invention. Those components to be deemed identical with those of the second and third embodiments are designated by the same reference numerals as used in the description of the both embodiments, and a detailed description thereof will be omitted below.

In the fourth embodiment, a hydrogen sensor 31 is provided downstream of the ventilation pipe 23 of the second and third embodiments.

According to the fourth embodiment, in cases where the relief valve 29 is out of order and thus is left open wide or partially even when generation of electric power continues in the fuel cell stack 4, the hydrogen sensor 31 detects hydrogen leaking from the exhaust fuel diluter 6 to the ventilation pipe 23, so that the increase in concentration of hydrogen in a location downstream of the ventilation pipe 23 can be monitored. Such arrangement of the hydrogen sensor 31 makes it possible to immediately detect the breakdown of the relief valve 29 which could occur for some reason.

Figure 12:
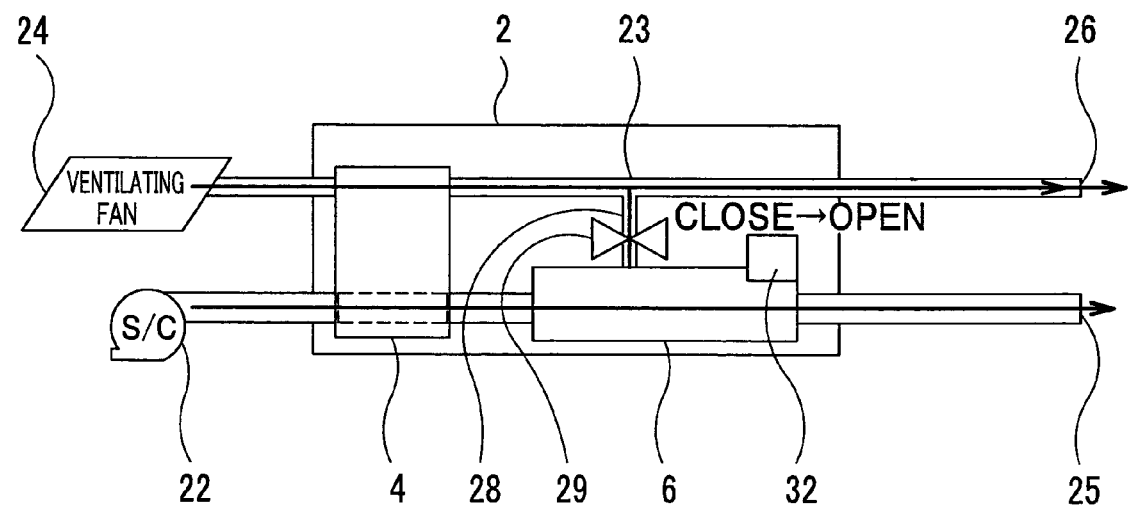
FIG. 12 is a system chart of a principal portion of an exhaust gas processing device for a fuel cell according to a fifth embodiment of the present invention.

Referring now to FIG. 12, a description will be given of a fifth embodiment of the exhaust gas processing device for a fuel cell according to the present invention. Those components to be deemed identical with those of the first and second embodiments are designated by the same reference numerals as used in the description of the both embodiments, and a detailed description thereof will be omitted below.

In the fifth embodiment, a hydrogen sensor 32 is provided in the exhaust fuel diluter 6.

According to the fifth embodiment, a decreasing concentration of purged hydrogen remaining in the exhaust fuel diluter 6, which results from dilution by the action of the supercharger 22 and/or the fan 24, can be monitored using the hydrogen sensor 32. Accordingly, the operation of the supercharger 22 and/or the fan 24 can be stopped in a timely manner when the concentration of hydrogen in the exhaust fuel diluter 6 reaches a predetermined level which is deemed sufficiently low. Consequently, the concentration of hydrogen in the exhaust fuel diluter 6 can be managed more easily.

Although the preferred embodiments of the present invention have been described above, various modifications and changes may be made in the present invention without departing from the spirit and scope thereof.

What is claimed is:

1. A method for processing exhaust gas from a fuel cell, wherein the fuel cell is supplied with air and hydrogen gas to generate electric power, the method comprising the steps of:
   discharging hydrogen gas exhausted from a hydrogen recirculation piping system connected to an anode of the fuel cell to a reservoir;
   stopping generation of electric power in the fuel cell;
   diluting the hydrogen gas in the reservoir by operating a blower for a predetermined period of time to supply air to the reservoir after stopping generation of electric power, the predetermined period of time being calculated from a capacity of the reservoir and an amount of hydrogen gas discharged from the fuel cell; and
   discharging the diluted hydrogen gas from the reservoir.

2. The method according to claim 1, wherein the step of diluting the hydrogen gas comprises the step of sucking the hydrogen gas into a cathode exhaust gas pipe arranged in the reservoir, through suction holes provided in the cathode exhaust gas pipe by the action of exhaust air flowing in the cathode exhaust gas pipe and discharged to outside.

3. The method according to claim 1, wherein the step of diluting the hydrogen gas comprises the step of supplying air from a cathode of the fuel cell after stopping generation of electric power.

4. The method according to claim 1, wherein the step of diluting the hydrogen gas comprises the step of opening a relief valve between the reservoir and a ventilator pipe to supply the hydrogen gas from the reservoir to the ventilator pipe, such that the hydrogen gas is diluted with ventilation gas in the ventilator pipe.

5. The method according to claim 4, wherein the step of discharging the diluted hydrogen gas comprises discharging the hydrogen gas and ventilation gas through a ventilation port.

6. A method for processing exhaust gas from a fuel cell, wherein the fuel cell is supplied with air and hydrogen gas to generate electric power, the method comprising the steps of:
   discharging hydrogen gas exhausted from a hydrogen recirculation piping system connected to an anode of the fuel cell to a reservoir;
   stopping generation of electric power in the fuel cell;
   diluting the hydrogen gas in the reservoir by operating a blower until a concentration of hydrogen in the reservoir is below a predetermined value to supply air to the reservoir after stopping generation of electric power, the concentration of hydrogen in the reservoir being monitored using a hydrogen sensor, the diluting step further comprising opening a relief valve between the reservoir and a ventilator pipe to supply the hydrogen gas from the reservoir to the ventilator pipe, such that the hydrogen gas is diluted with ventilation gas in the ventilator pipe; and
   discharging the diluted hydrogen gas from the reservoir.

7. The method according to claim 6, wherein the step of diluting the hydrogen gas comprises the step of sucking the hydrogen gas into a cathode exhaust gas pipe arranged in the reservoir, through suction holes provided in the cathode exhaust gas pipe by the action of exhaust air flowing in the cathode exhaust gas pipe, and discharged to outside.

8. The method according to claim 6, wherein the step of diluting the hydrogen gas comprises the step of supplying air from a cathode of the fuel cell after stopping generation of electric power.

9. The method according to claim 6, wherein the step of discharging the diluted hydrogen gas comprises discharging the hydrogen gas and ventilation gas through a ventilation port.

* * * * *